United States Patent
Roca et al.

(10) Patent No.: US 9,050,867 B2
(45) Date of Patent: Jun. 9, 2015

(54) SLIP-PROOF COVER FOR VEHICLE TIRES

(76) Inventors: Sergio Lopez Roca, Terrassa (ES); Isaac Valls Chaparro, Sabadell (ES)

( * ) Notice: Subject to any disclaimer, the term of this patent is extended or adjusted under 35 U.S.C. 154(b) by 0 days.

(21) Appl. No.: 12/392,067

(22) Filed: Feb. 24, 2009

(65) Prior Publication Data

US 2009/0159168 A1 Jun. 25, 2009

Related U.S. Application Data

(63) Continuation of application No. 11/180,698, filed on Jul. 14, 2005, now abandoned.

(30) Foreign Application Priority Data

Jul. 14, 2004 (ES) .................................... 200401719
Jun. 14, 2005 (EP) ..................................... 05381029

(51) Int. Cl.
*B60C 27/00* (2006.01)
*B60C 27/18* (2006.01)

(52) U.S. Cl.
CPC ...................................... *B60C 27/18* (2013.01)

(58) Field of Classification Search
CPC ........ B60C 27/00; B60C 27/06; B60C 27/16; B60C 27/18
USPC ......... 152/167–168, 170–173, 175, 185, 187, 152/208, 221, 213 R, 213 A
See application file for complete search history.

(56) References Cited

U.S. PATENT DOCUMENTS

| | | | | |
|---|---|---|---|---|
| 835,502 A | 11/1906 | Cornish | ........................ | 152/170 |
| 880,274 A | 2/1908 | Brophy | ........................ | 152/175 |
| 1,772,458 A * | 8/1930 | Diamond | ...................... | 428/107 |
| 2,682,907 A | 7/1954 | Krueger | ........................ | 152/222 |
| 2,777,497 A | 1/1957 | Hildebrant | .................... | 152/175 |
| 3,335,776 A | 8/1967 | Peterson | ........................ | 152/222 |
| 3,795,096 A * | 3/1974 | Dunwoody, Jr. | .................. | 57/204 |
| 4,884,323 A | 12/1989 | Provost et al. | .................... | 24/442 |
| 5,439,727 A | 8/1995 | Riggs et al. | ...................... | 428/128 |
| 6,790,797 B1 * | 9/2004 | Benim et al. | ................... | 442/335 |
| 7,013,548 B1 | 3/2006 | Lotveit | ......................... | 29/450 |
| 7,582,132 B2 * | 9/2009 | Jaffee | .............................. | 55/524 |
| 2002/0189022 A1* | 12/2002 | Chang | ........................ | 8/115.51 |
| 2005/0263228 A1 | 12/2005 | Martin et al. | .................. | 152/170 |
| 2006/0011281 A1* | 1/2006 | Roca et al. | ..................... | 152/216 |
| 2006/0183391 A1* | 8/2006 | Crook et al. | ................... | 442/203 |

FOREIGN PATENT DOCUMENTS

EP 1165329 1/2002

* cited by examiner

*Primary Examiner* — Jason Bellinger
(74) *Attorney, Agent, or Firm* — Ostrolenk Faber LLP

(57) ABSTRACT

A slip-proof cover for a vehicle tire for use in adverse weather conditions, including snow or ice, with a configuration that allows a simple mounting. The cover is highly reliable and positionally stable, and has a good mechanical performance with respect to abrasion. The cover includes a band made of textile fabric including cords made of strands that may be of varying thicknesses and the textile ligament may be taffeta.

10 Claims, 5 Drawing Sheets

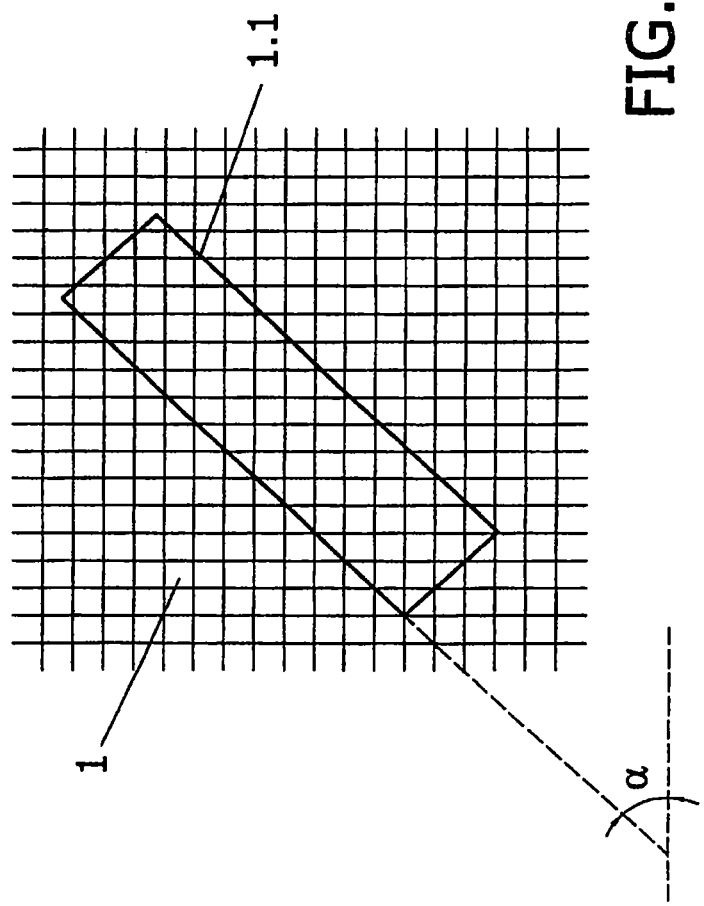

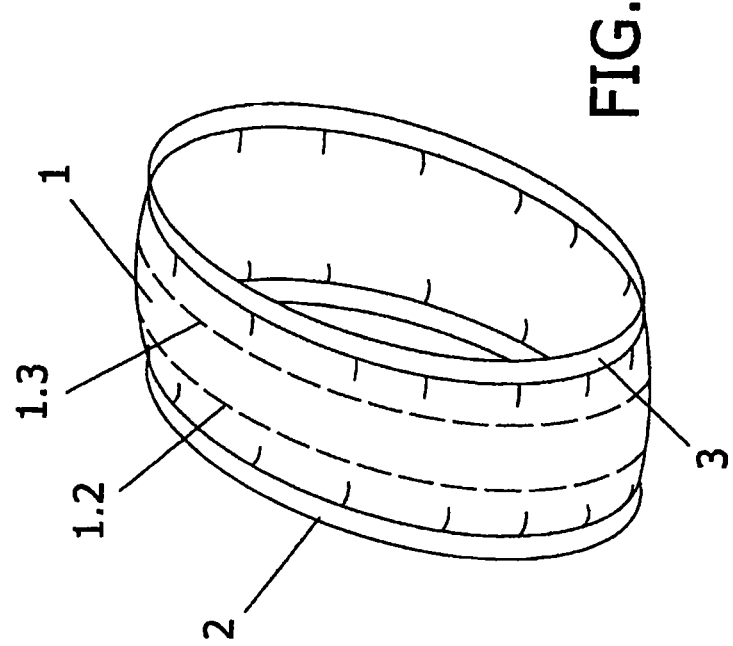

SLIP-PROOF COVER FOR VEHICLE TIRES

CROSS-REFERENCE TO RELATED APPLICATIONS

This is a continuation of U.S. patent application Ser. No. 11/180,698, filed Jul. 14, 2005, now abandoned, in the name of Sergio Lopez ROCA and Isaac Valls CHAPARRO and entitled SLIP-PROOF COVER FOR VEHICLE TYRES, which claims priority of European Patent Application No. 05381029.7, filed Jun. 14, 2005, and also of Spanish Patent Application No. ES 2004/01719, filed Jul. 14, 2004, which are herein incorporated by reference.

FIELD OF THE INVENTION

The present invention relates to a slip-proof cover for vehicle tires in adverse weather conditions, preferably ice or snow.

The cover is characterized by a configuration that makes it easy to mount, providing a high reliability and positional stability and good mechanical properties regarding the abrasion implied by its use in its intended conditions.

The cover is also characterized by a structure and composition of the slit that optimize its slip-proof capacities and its resistance to abrasion.

BACKGROUND OF THE INVENTION

Driving a vehicle provided with inflatable tires on slippery surfaces such as snow or ice is dangerous, due to the sharp reduction of the coefficient of friction.

If the coefficient of friction is reduced by the presence of ice, the latter's stiffness requires the use of solutions based on metal protrusions or the like.

Tires are known with studs meant to insert in the ice or snow to improve the grip. These types of tires are used when there are snow or ice conditions at all times, such as for vehicles used in ski resorts.

In situations where an improved grip is occasionally required, such as when having to cross a snow-covered mountain pass, other auxiliary means are common that are easier to mount and remove, such as snow chains.

Auxiliary elements of this type use diverse attachment solutions that seek a simple installation.

Chains are bulky and take up significant space in the vehicle's luggage compartment. The stiffness of the chain allows it to stick in the snow; however, it also means that considerable stresses are applied on the tire surface, damaging it.

This damage is greater when there are areas without snow to cushion the impact of the chain on the ground. These areas are sometimes so short that it is not worth removing and installing the chains again.

Also known is the use of covers as alternatives to chains. In this sense must be cited European Patent with publication number EP1165329, which describes and protects a device that can be fitted on vehicle tires to increase the friction between the tire and the road.

The configuration of this cover consists of a belt that surrounds the tire with an oversize of 4%, its outer part being fully closed and its inner part having a strip with an elastic peripheral asymmetric tensor.

The present invention consists of a design of a cover with a fabric specifically conceived to withstand shear stresses, improve the grip and improve positional stability.

SUMMARY OF THE INVENTION

Features consistent with the principles of some embodiments of the present invention provide for a slip-proof cover for vehicle tires that consists of a main band made of high-strength textile material and symmetrically-arranged lateral elastic adjusters that facilitate mounting and removing it.

The high-strength central band includes of a swath of cord fabric made of several strands.

The presence of several strands allows increase the strength and thickness of each cord to provide a surface with a better grip on the slippery surface.

The main textile band includes cords of different thickness, providing the band with protrusions and irregularities that improve its adherence to the ground.

The fabric incorporates a textile ligament, preferably made of taffeta, which completes the composition of the fabric.

The main band is a swath cut along an angle from 45° to 90° so that fibers that were originally longitudinal and transverse will be at a 45° angle. Note that angles under 45° result in equivalent configurations, as the longitudinal fibers become transverse fibers.

The specific case in which the angle is 45° with variations of up to 10° in the orientation of the fibers is of particular interest. This inclination has been compared to the natural orientation of 90° and has been shown to improve the two variables of greatest interest: friction on slippery surfaces such as snow or ice and resistance to wear.

The reason for this is that the unraveling is minimized, as the forces act identically on all fibers. It must be pointed out that if the longitudinal or transverse fibers suffer greater loads or abrasion than the others the entire fabric is deteriorated. The ideal solution is to balance the external demands on the fiber between the fibers having one orientation and the other, to provide an optimum overall performance.

Possible cutting means are laser, scissors or heat soldering. In cases in which cutting produces localized fusion, cut ends show a lower tendency to unraveling before they are sewn.

The cover of the invention can be treated to control the proliferation of mites and bacteria. For this purpose, the cord that forms part of the cover is treated with an anti-mite and antibacterial product. The cover can be stored unused for a long time without developing bad odors and without becoming a source of proliferation of micro-organisms.

BRIEF DESCRIPTION OF THE DRAWINGS

The description is completed with a set of drawings that illustrate exemplary embodiments of the invention without limiting it in any way.

FIG. 1 is a schematic representation of the fabric constituted by longitudinal and transverse fibers, as well as of the orientation of the cut.

FIG. 2 is a perspective view of the cover without being folded and its position on the tire. The tire is not shown.

FIG. 3A shows a representation of an embodiment of the seams in the cover, not covered by the present invention, while

DETAILED DESCRIPTION

FIG. 1 shows a representation of the fabric (1) with its fibers arranged longitudinally and transversally.

On this fabric (1) a band (1.1) is cut along a 45° angle (α), which is considered most advantageous within the admissible range from 45° to 90° such that with respect to this band the longitudinal and transverse fibers will now be diagonal.

Figure 4:
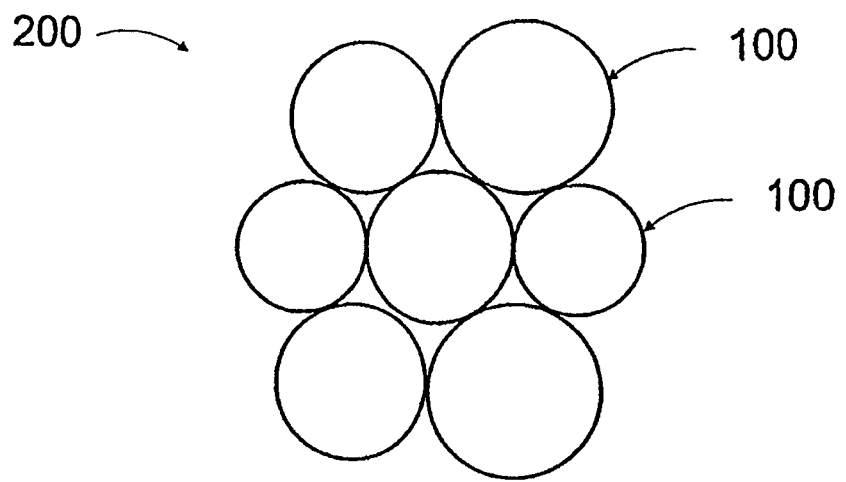
FIG. 4 illustrates an exemplary diagram of a cross-section of a cord including a plurality of strands consistent with the principles of some embodiments of the present invention.

The fabric is made of a material with a high tenacity spun from several strands (this example uses from 5 to 9 strands) to provide a sufficiently coarse texture to improve adherence and increase its resistance. FIG. 4 depicts an exemplary diagram of a cross section of a cord comprising seven (7) strands 100, wherein at least one of the strands has a different thickness from another strand.

The fabric (1) has been manufactured with a surface density from 0.3 to 1 Kg/m² using taffeta ligament.

On this fabric (1) a rectangular oblique cut (α) is made at 45° with a length equal to the perimeter of the cover plus the width of the seam strips and a width greater than that of the tire.

Elastic adjusting straps (2) are incorporated on the sides of the cover that are fitted on either side of the tire to stabilize the installation.

FIG. 2 shows dashed and dotted lines (1.2, 1.3) representing the positional references for the tire edges.

The fabric used for the cover is preferably polypropylene due to its high tenacity, its water-repelling properties and recyclability.

Polypropylene has a low density, less than that of water, so that the cover made with this material has a lower weight than covers with the same volume made with higher density materials.

In a second exemplary embodiment the material of the cover is para-aramid fiber, which is very strong, fireproof and corrosion proof.

In another exemplary embodiment, the cover can be made of a closed annular piece with a seam (3) that joins the minor ends of the band (1.1). As illustrated in FIG. 3, the minor ends of the band (1.1) are transverse to the tire edges 1.2 and 1.3 illustrated in FIG. 2.

Figure 3A:
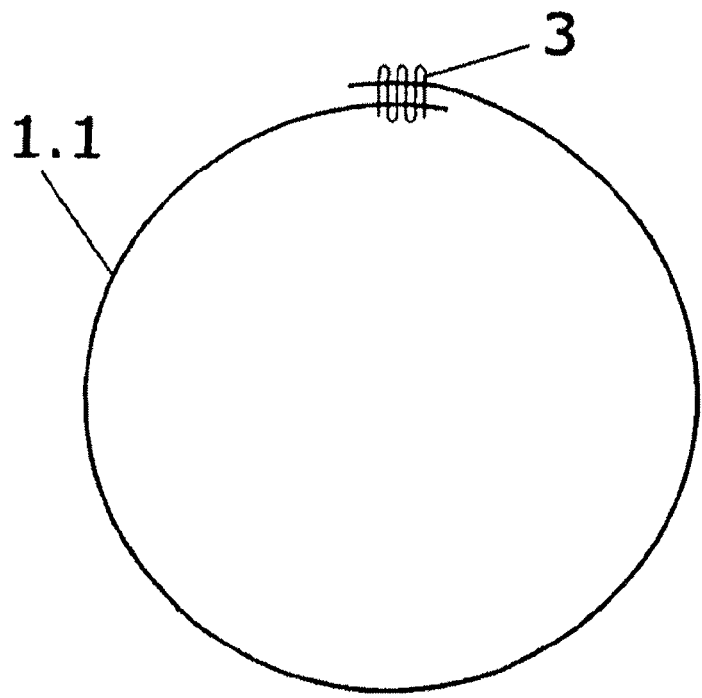

This type of seams (3) are normally made by overlapping one end on the other, as shown in FIG. 3A (which represents an embodiment not covered by the present invention), and constitute the principal breaking point of the cover.

In the cover, the seam (3) is made by sewing at the points of contact of portions of end regions of the band (1.1) and folding free portions of the end regions of the band (1.1) outward apart from the seam.

Figure 3B:
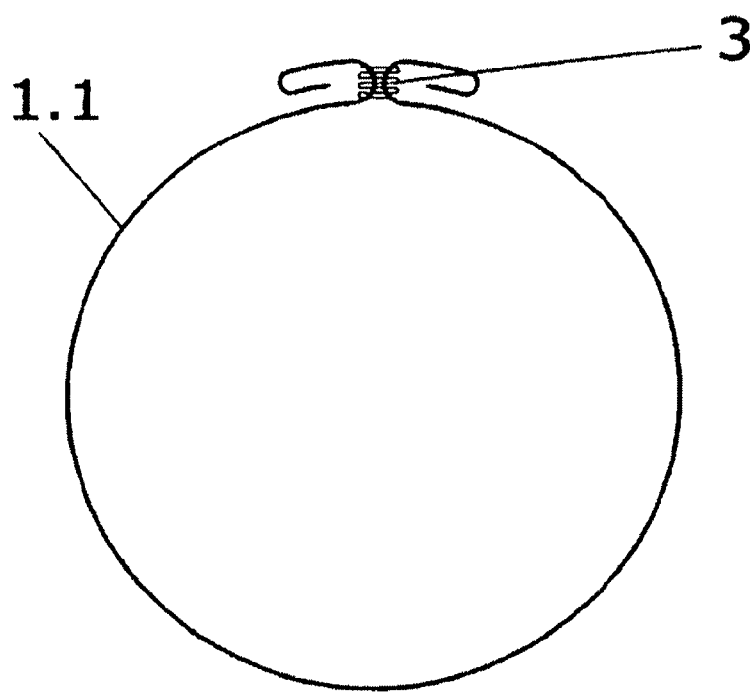
FIG. 3B shows a representation of the seam of the cover of the present invention.

FIG. 3B shows respective portions of facing end regions of the annular piece forming the band (1.1) being secured together by a seam and respective free portions of said facing end regions being folded outwardly apart from the seam, said free portions extending from said seam to respective free ends of the facing end regions. Said free portions of the band (1.1) are folded outward at the time of constituting the seam so that this union line is reinforced.

The piece can be constituted as an open rectangular piece with closure means at its ends.

Figure 5:
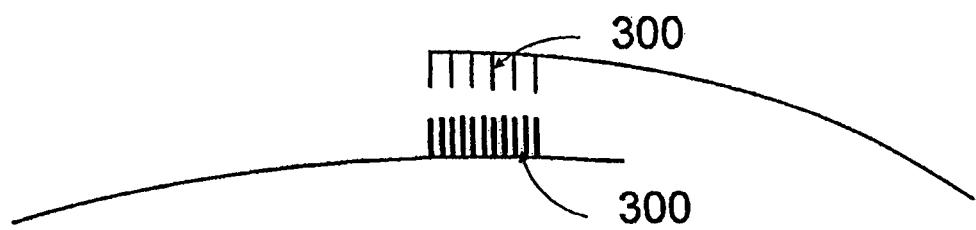
FIG. 5 illustrates an exemplary diagram of a closure including VELCRO© strips consistent with the principles of some embodiments of the present invention.

These closure means are preferably VELCRO© strips. FIG. 5 depicts an exemplary diagram of the closure 300 including VELCRO© strips. A VELCRO© strip may comprise a surface of hooks that fasten to a corresponding strip with a surface of uncut pile.

The essence of this invention is not affected by variations of the materials, shape, size and arrangement of the component elements, described in a non-limiting manner that should allow its reproduction by an expert in the field.

The invention claimed is:

1. A slip-proof cover configured to be mounted on a vehicle tire that moves on a surface, the slip-proof cover comprising:
   one main band having a first major lateral edge and a second major lateral edge corresponding to a first and a second lateral portion of the tire, respectively, the first major lateral edge and the second major lateral edge configured to extend annularly around the tire;
   the one main band comprising a textile fabric comprising a plurality of cords such that fibers of the plurality of the cords are oriented at an orientation angle of between 45° and 90° from the first major lateral edge and are configured to contact the surface so as to provide traction;
   each cord of the plurality of cords spun with a plurality of strands with a textile ligament;
   the textile fabric having a surface density of 0.3 to 1 kg/m²; and
   the main band having a width greater than a width of the tire, the band is formed as an annular piece having facing end regions at two minor sides transverse to the first major lateral edge and the second major lateral edge of the band, respective portions of the facing end regions being secured together by a seam and respective free portions of the facing end regions being folded outwardly apart from the seam, said free portions extending from said seam to respective free ends of the facing end regions, and the cover further comprising:
   a first adjusting strap and a second adjusting strap positioned on the first major lateral edge and the second major lateral edge, respectively, and configured to be fitted, respectively, on the first lateral portion and the second lateral portion of the tire,
   wherein a first cord of the plurality of cords has a cord thickness thinner than the cord thickness of a second cord of the plurality of cords, and the first cord is interspersed with the second cord so as to provide protrusions and irregularities for the textile fabric to improve traction on the surface during use.

2. The slip-proof cover according to claim 1, wherein the orientation angle is 45° plus/minus 10°.

3. The slip-proof cover according to claim 1, wherein the textile ligament comprises taffeta.

4. The slip-proof cover according to claim 1, wherein the plurality of strands comprises 5 to 9 strands.

5. The slip-proof cover according to claim 1, wherein the fabric comprises polypropylene.

6. The slip-proof cover according to claim 1, wherein the fabric comprises para-aramid.

7. The slip-proof cover according to claim 1, further comprising an anti-mite treatment provided on the plurality of cords.

8. The slip-proof cover according to claim 1, further comprising an anti-bacterial treatment provided on the plurality of cords.

9. The slip-proof cover according to claim 1, wherein the band is formed as a rectangular piece having facing end regions at two minor sides transverse to the first major lateral edge and the second major lateral edge of the band and comprising closure means at the facing end regions.

10. The slip-proof cover according to claim 9, wherein the closure means comprise strips comprising hooks configured to fasten to corresponding piles.

* * * * *